United States Patent [19]

Stewart

[11] Patent Number: 4,684,872
[45] Date of Patent: Aug. 4, 1987

[54] BATTERY FORMATION CHARGING APPARATUS

[75] Inventor: Jim L. Stewart, Leesport, Pa.

[73] Assignee: General Battery Corporation, Reading, Pa.

[21] Appl. No.: 795,637

[22] Filed: Nov. 6, 1985

[51] Int. Cl.[4] .............................................. H02J 7/04
[52] U.S. Cl. ....................................... 320/45; 320/36; 320/40
[58] Field of Search ................... 320/2, 39, 40, 35, 44, 320/45, 36; 364/480, 481, 483, 492, 493

[56] References Cited

U.S. PATENT DOCUMENTS 4,532,418  7/1985  Meese et al. ............................ 320/2

OTHER PUBLICATIONS

Undated brochure entitled "MicroForm MP5500–Programmed Formation Charging System, published by Firing Circuits, Inc., Muller Ave., P.O. Box 2007, Norwalk, Conn. 06852.
Advertisement by Firing Circuits, Inc. for the Firing Circuits MicroForm MPG–5500, on p. 74 of a publication Entitled "The Battery Man", vol. 27, No. 10, Oct. 1985.
Advertisement by Digatron for its Computer Control Formation System BA/FOX–500, p. 9 of a publication entitled "The Battery Man", vol. 29, No. 8, Aug. 1985.

Primary Examiner—Patrick R. Salce
Assistant Examiner—Anita M. Ault
Attorney, Agent, or Firm—Benasutti and Murray

[57] ABSTRACT

An apparatus for charging electric storage batteries comprises a host computer for providing charging information to and receiving status information from a plurality of slave computers. The slave computers are coupled to the host computer by means of a fiber optic data link. A plurality of control modules are coupled to each slave computer. Each control module applies charging current to a plurality of electric storage batteries in response to instructions received from the slave computer. Each control module also sends charging and battery temperature status information back to its respective slave computer.

11 Claims, 2 Drawing Figures

BATTERY FORMATION CHARGING APPARATUS

BACKGROUND OF THE INVENTION

The present invention relates generally to equipment for charging electric storage batteries and more particularly to apparatus for formation charging wet electrical storage batteries.

Formation is a step in the construction of lead acid electric storage batteries wherein the active materials of the cell, that is sponge lead on the negative plates and lead peroxide on the positive plates are created. This can be accomplished by mounting positive plates, alternating with negative plates in a tank containing forming acid. The plates are then subjected to a charging current which is applied at a predetermined magnitude for a predetermined period of time. Another method of formation involves applying charging current to the completed battery. Using this formation process, groups of completed batteries, each containing electrolyte, are typically connected in series. A DC power supply is then electrically connected across the series connection of batteries, in order to apply a charging current of a predetermined magnitude for a predetermined period of time. The current magnitude and charging time depends on the characteristics of the battery being formed. Upon reaching the predetermined time and predetermined constant current, the plates of the batteries are considered to be fully formed.

In one commonly used technique, battery plates are formed using battery chargers having timers and current controls which are set by an operator to provide a predetermined amount of current for a predetermined period of time. The operator is required to determine the battery type, the required formation current and time, then set the charger accordingly. These settings, once made by the operator are assumed to be correct for the particular battery type. However, it has been found that the actual current applied as well as the time during which it was applied could vary considerably from that specified. Such variation can lead to excessive and unnecessary energy consumption.

In addition, using this technique, the operator is required to at least periodically monitor the temperature of the batteries in the formation area to insure that overheating does not occur. This leads to increased manufacturing costs due to the additional manpower required to perform the required monitoring.

SUMMARY OF THE INVENTION

It is therefore an object of the present invention to provide apparatus for forming batteries which will permit a reduction in the cost of battery manufacturing.

It is a further object of the present invention to improve the quality of battery formation.

It is yet another object of the present invention to provide apparatus for monitoring ampere hours used to form the battery and eliminate the waste of overcharge energy.

It is still another object of the present invention to automatically monitor battery formation temperature.

It is yet another object of the present invention to provide apparatus for minimizing human error in the set-up and performance of battery formation.

These and other objects of the invention are accomplished by providing battery formation apparatus comprising a host computer in communication with a plurality of slave computers. Information concerning the battery type to be formed is provided to the host computer. The host computer then communicates the formation schedule required for the battery type selected, to each of the slave computers. Each slave computer controls a plurality of battery formation modules. Each battery formation module applies forming current to a plurality of batteries. In addition, each slave computer monitors the temperatures of batteries being formed under its control.

The system operates as follows. After receiving the battery type information, the host computer instructs the slave computers to cause the formation modules to output a current of a predetermined magnitude for a predetermined period of time as required by that battery type. Once started, the slave computers will control the charging operation without intervention by the host computer. The host computer stores in memory the charging schedules for all battery types to be formed.

The temperatures of the batteries are monitored and can be displayed on the cathode ray tube (CRT) screen of the host computer. Temperature maximums are indicated for each step. If temperature rises above safe predetermined levels, formation current is reduced and water valves are opened to supply a flow of cooling water around the batteries as needed to reduce the elevated temperature. If temperature cannot be reduced and the maximum temperature level is reached, the system will turn the charger off and flag the operator with a temperature failure. As the batteries cool, the current will increase, preferably in 5 amp increments, to the scheduled step current in order to enable the fastest possible charging.

For further detail regarding the battery formation charging apparatus of the present invention, reference is made to the following detailed description, taken in conjunction with the following illustrations.

DETAILED DESCRIPTION OF THE PREFERRED EMBODIMENT

Figure 1:
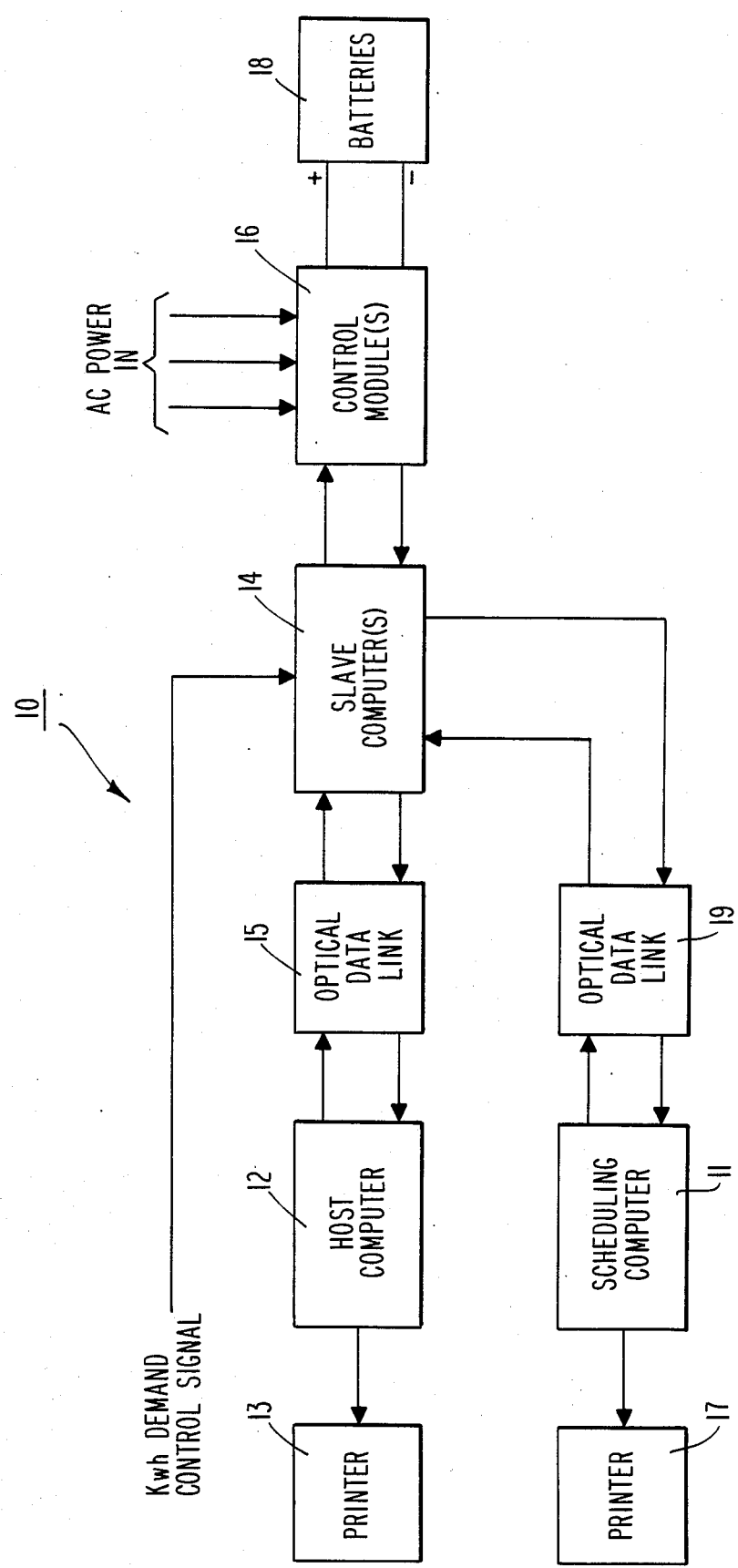
FIG. 1 is a block diagram of a preferred embodiment of the battery formation charging apparatus of the present invention.

Although specific forms of the inventions have been selected for illustration in the drawing, and the following description is drawn in specific terms for the purpose of describing these forms of the invention, this description is not intended to limit the scope of the invention which is defined in the appended claims.

FIG. 1 is a block diagram of a preferred embodiment of the battery formation charging apparatus, generally designated 10. The formation charging apparatus 10 comprises a host computer 12 which is connected to a printer 13 and is also coupled to at least one slave computer 14 by means of a first fiber optic data link 15. In the preferred embodiment of the present invention, up to 512 slave computers 14 can be coupled to the host computer 12. A scheduling computer 11 is connected to a printer 17 and is also coupled to the slave computer(s) 14 by means of a second fiber optic data link 19. The host computer 12 and the scheduling computer 11 are preferably IBM PC's and each slave computer 14 is preferably a Wintek Corp. Micro Module System comprising the following components:

(1) APS21 Power Supply
(1) ACR32 Card Rack
(1) ABP09 Backplane
(2) MDS80 Driver/Sensor Module (outputs to I1, I2, water valve, and control relay)
(4) MA120 Analog Interface Module (analog output to the firing board)
(1) MA104 Analog Interface Module (shunt signal input)
(1) MRR29 RAM/ROM Module (program storage area for slave unit)
(1) 8K RAM ARA09 (additional RAM memory for above module)
(2) AER64 EPROM
(1) MCH08 6809 Module (microprocessor)
(2) ACA22 Cable Assembly
(5) Ribbon Cable (module interconnection)

Functional descriptions of and specifications for each of the above listed components can be found in Wintek Catalog No. 0183 published by the Wintek Corp., 1801 South Street, Lafayette, IN 47904 and such descriptions and specifications are incorporated into this detailed description by reference as if fully set forth herein.

The first and second fiber optic data links 15 and 19, each preferably comprises an EOTec Corp. type RS-232C Data Link, part no. 221001 (one required for the host computer 12, one required for the scheduling computer 11, and one for each slave computer 14); and an 8 Port Active Star Coupler, part no. 21200 (one required for each group of seven slave computers). Functional descriptions of the specification for these components are contained in specification sheets published by the EOTec Corporation, 420 Frontage Road, West Haven, CT. 06516 and such descriptions and specifications are incorporated into this detailed description by reference as if fully set forth herein.

At least one control module 16 is coupled to each slave computer 14. In the preferred embodiment, up to 8 control modules can be coupled to each slave computer 14. A set of batteries 18 is connected to each control module. The set of batteries can comprise about ten to twenty batteries; however, eighteen batteries per set is preferred. A kilowatt hour demand control signal, furnished by the power company metering equipment, is coupled to an I/O port of a slave computer 14. The pulses reference the amount of kilowatt-hour demand in use. The power company charges a kilowatt rate based upon the largest demand for any given 15 minute period in the billing cycle. To reduce cost, it is desirable to maintain the kilowatt demand below a predetermined level. The kilowatt demand information, in the form on the pulses supplied by the power company, is formatted by the slave computer 14 then relayed to the host computer 12 by way of the optical data link 15. If the demand is too high, the host computer 12 will poll the slave computers 14 by priority to determine the possibility of reducing kilowatt demand. All low priority circuits will then be reduced in current to the level required to meet the demand. However, the current will not be decreased below a predetermined trickle charge level, for example 2 amperes in the preferred embodiment. As the higher priority circuits are completed, or as other loads in the plant are reduced, the current is increased by the necessary amounts to normal charge rate, keeping the kilowatt-hour demand below the limit.

Figure 2:
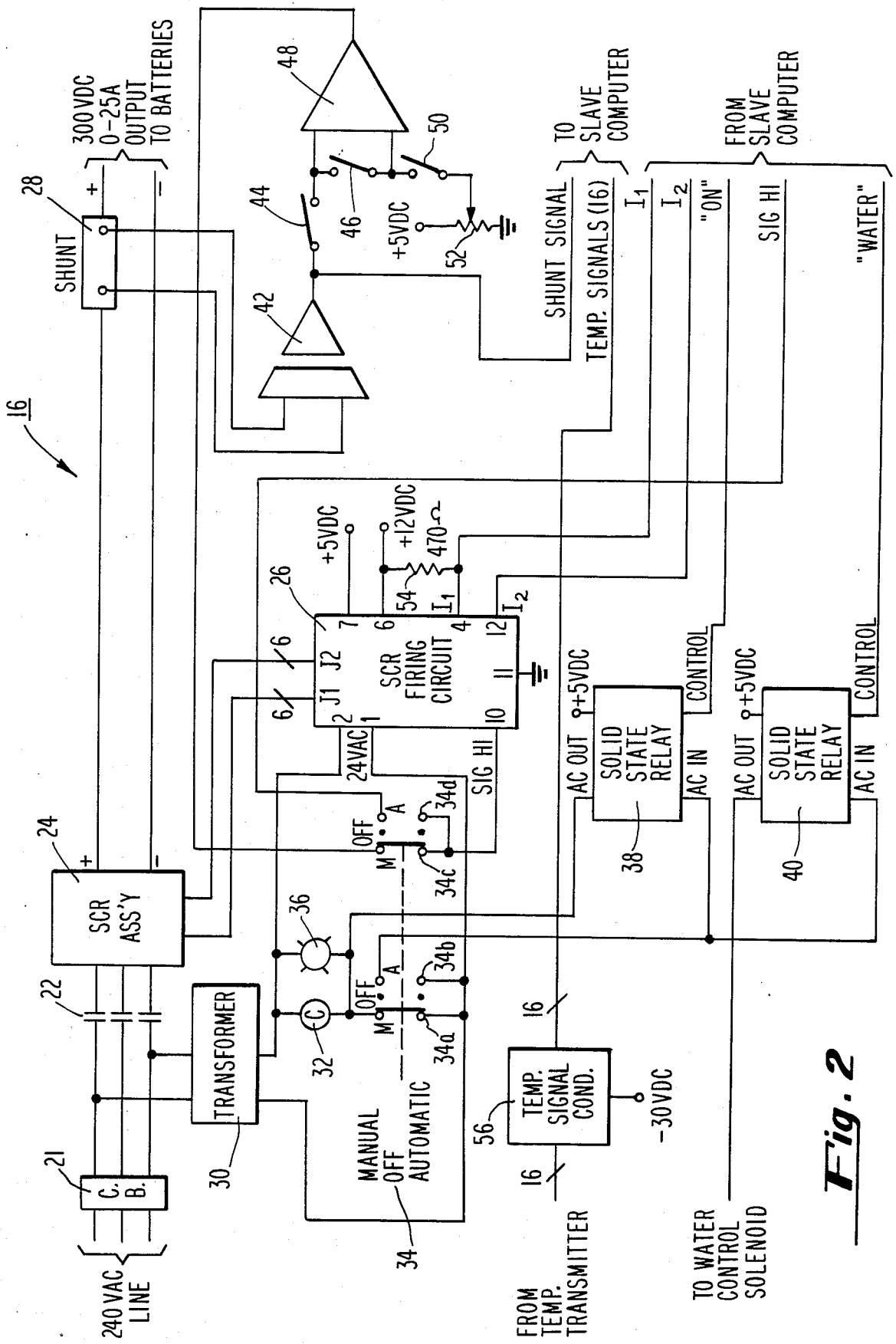
FIG. 2 is a schematic block diagram of a control module in accordance with a preferred embodiment of the present invention.

Referring to FIG. 2, there is shown a schematic block diagram of a typical control module 16. The control module 16 comprises a three-phase circuit breaker 21 which is connected to a three-phase 240 VAC input power source. A set of three phase electrical contactor contacts 22 are connected to the circuit breaker 21 on the load side. The contactor contacts 22 are electrically connected to a silicon controlled rectifier (SCR) assembly 24. The SCR assembly 24 comprises three line connected SCR's and three load connected SCR's. The anode of each line connected SCR is connected to the negative (−) output terminal of the SCR assembly 24. The cathode of each line connected SCR is electrically connected to the anode of a respective load connected SCR as well as to the respective phase of the input three phase AC. The cathode of each load connected SCR is connected to the positive (+) output terminal of the SCR assembly 24.

The gate and cathode terminals of each SCR (six gates and six cathodes for a total of twelve connections in the preferred embodiment) are connected to an SCR firing circuit 26. The SCR firing circuit 26 is preferably an Enerpro, Inc., "Three Phase SCR Firing Package", Part No. FCOG6100. The functional description of and the specification for the SCR firing circuit 26 are contained in Product Data sheets FP783-1, R054 and R055 published by Enerpro, Inc., 5780 Thornwood Drive, Goleta, CA. 93117, and such descriptions and specifications are incorporated into this detailed description by reference as if fully set forth herein.

The gate and cathode of the phase a load connected SCR are connected to terminals 1 and 2 respectively of connector J1 of the firing circuit 26; the gate and cathode of the phase B load connected SCR are connected to pins 4 and 5; and the gate and cathode of the phase C load connected SCR are connected to pins 7 and 8. The gate and cathode of the phase A line connected SCR are connected to pins 1 and 2 of connector J2; the gate and cathode of the phase B line connected SCR are connected to pins 4 and 5; and the gate and cathode of the phase C line connected SCR are connected to pins 7 and 8. A series R-C filter circuit is connected between the anode and cathode terminals of each SCR. Under control of the SCR firing circuit 26, as will be subsequently explained, SCR assembly 24 provides an output of 300 volts DC in a current range of 0-25 amps.

The positive (+) output of the SCR assembly 24 is connected to one current terminal of a shunt 28. The shunt 28 preferably has an output voltage to current ratio of 100 mv/25A. That is, with 25 A of current through the shunt 28, a voltage equal to 100 mv will appear across its voltage terminals. The other current terminal of the shunt 28 is connected to the positive (+) terminal of the battery set. The negative (−) terminal of the battery set is electrically connected to the (−) output of the SCR assembly 24. In the preferred embodiment, each battery set comprises 18 batteries electrically connected in series.

A step-down transformer 30 is electrically connected across two phases of the 240 volts AC power input, on the load side of the circuit breaker 20. In the preferred embodiment, the output of the step-down transformer 30 is 24 volts AC which is electrically connected to pins 1 and 2 of connector J3 of the SCR firing circuit 26. Application of 24 VAC provides operating power to the SCR firing circuit 26. The 24 volt AC output of the step-down transformer 30 is also connected across the series connection of a contactor coil 32 and a first set of manual mode contacts 34(a) of a manual/automatic mode switch 34. Application of 24 volts AC to the contactor coil 32 causes the three-phase contactor contacts 22 to close. A pilot lamp 36 is electrically connected in parallel across the contactor 32.

A first set of automatic mode contacts 34(b) of the manual/automatic mode switch 34 are electrically connected in series between an output terminal of the step-down transformer 30 and the AC input terminal of the step-down transformer 30 and the AC input terminals of a first solid-state relay 38 and a second solid-state relay 40. In the preferred embodiment, the first and second solid state relays 38 and 40 are Potter & Brumfield type EAX1DA12, 5VDC relays. An AC output terminal of the first solid state relay 38 is connected to the contactor coil 32 and the pilot lamp 36 at the series connection point between the first manual mode contacts 34(a) and the contactor coil 32. The AC output terminal of the second solid-state relay 40 is connected to a water control solenoid (not shown). Under command of a signal at its control input, the solid-state relay switches the AC present on the AC input terminal to the AC output terminal. The control terminal of the first solid-state relay 38 is connected to an "ON" output of the slave computer 14. The control terminal of the second solid-state relay 40 is connected to a "WATER" output of the slave computer 14.

The voltage terminals of the shunt 28 are electrically connected to the inputs of an isolation operational amplifier 42. The isolation operational amplifier 42 is preferably a Datel Corp. type AM-227. The output of the isolation operational amplifier 42 is electrically connected to a shunt signal input of the slave computer 14 as well as to one contact of a first single pole, single throw (SPST) switch 44. The isolation operational amplifier 42 isolates the 300 VDC present at the shunt 20 from the logic circuitry. It is preferred that the amplifier 42 have a gain of approximately 50. Consequently, the output of amplifier 42 will be 5 volts when the current passing through shunt 28 is equal to 25 A since the input voltage to the amplifier 42, which is the voltage appearing across the voltage terminals of the shunt 28, will be 100 mv. The output of the amplifier 42 is coupled as a "shunt signal" to the slave computer 14.

The other contact of the first switch 44 is electrically connected to one contact of a second SPST switch 46 and one input of an operational amplifier 48. The operational amplifier 48 is preferably a Motorola Corp. Type LM741. The other contact of the second switch 46 is electrically connected to the other input of the operational amplifier 48 and one contact of a third SPST switch 50. The other contact of the third switch 50 is electrically connected to a wiper of a potentiometer 52 which is electrically connected between +5 volts DC and ground. An $I_1$ signal output from the slave computer 14 is connected to pin 4 of connector J3 of the SCR firing circuit 26. An $I_2$ signal output from the slave computer 14 is connected to pin 12 of connector J3 of the SCR firing circuit 26. A 470 ohm logic pull up resistor 54 is electrically connected between a +12 volt DC output from pin 6 of connector J3 of the SCR firing circuit 26 and pin 4 thereof.

The output of the operational amplifier 48 is electrically connected to one side of a second set of manual mode contacts 34(c) of the manual/automatic mode switch 34. The other side of the contacts 34(c) is electrically connected to one side of a second set of automatic mode contacts 34(d) of the manual/automatic mode switch as well as a "SIG HI" signal input at pin 10 of connector J3 of the SCR firing circuit 26. The operational amplifier 48 is configured as an error amplifier. The potentiometer 52 will set a reference from 0-5 volts DC to differ with the shunt signal output from the isolation operational amplifier 42 which is, as explained above, ranges from 0-5 volts DC. The greater the difference, the more control voltage is applied to the firing board 26, thus applying more current to the circuit. This correction is made on every cycle of the three phase, or 360 times the second. This provides a manual closed loop through the contacts 34(c) if the computer should fail. Otherwise, the loop incorporating the operational amplifier 48 is not used. For calibration, to null the operational amplifier 48, switch 44 is opened, switch 46 is closed to short the inputs of the operational amplifier 48, and switch 50 is closed. The potentiometer 52 is then set to ground. The offset on operational amplifier 48 is then set for an output of "0". During normal operation, switch 44 is closed, switch 46 is opened and switch 50 is closed. The other side of the contacts 34(d) is electrically connected to a "SIG HI" signal output from the slave computer 14.

A temperature signal conditioning circuit 56 is coupled to a 4-20 ma temperature transmitter (not shown). The temperature conditioning circuit 56 preferably comprises sixteen precision resistors, each 250 ohms 1% in the preferred embodiment. One terminal of each resistor is electrically connected to a −30 volt DC voltage source. The other terminal of each precision resistor is electrically connected to a temperature output signal terminal of the temperature transmitter and a temperature signal input terminal of the slave computer 14. In the preferred embodiment, the temperature transmitter is connected to a 100 ohm RTD temperature sensor, associated with one battery in the set. In the preferred embodiment, the 100 ohm RTD, temperature sensor is an Action Instrument Corporation Type A-PX-1-18-3-1-4-W-192. As the sensed temperature increases, the resistance of the RTD also changes in proportion. This resistance is coupled to a resistance to current converter. In the preferred embodiment, the resistance to current converter is an Analog Devices Corporation Type AD693. The resistance to current converter converts the resistance change corresponding to temperature changes in the range of 0°-200° F. to a current change in the range of 4-20 ma. The power to operate this circuit is obtained from an interface signal conditioner board (not shown), making this a true two-wire transmitter. The 4-20 ma current is applied through a 200 ohm resistor to a return of a power supply (not shown). The voltage drop across the 250 ohm resistor with 4-20 ma through it, will be 1-5 volts DC, for the range of 0°-200° F. The 1-5 volts DC is coupled to an analog input of the slave computer 14. It is then converted into digital form by an analog to digital converter in the slave computer 14.

The battery formation charging apparatus 10 of the present invention operates as follows. The host computer 12 functions as the operator interface and contains all of the standard charging programs. Each slave computer 14 monitors the minute-by-minute charging operation. Once loaded and started by the host computer 12, each slave computer 14 will be able to charge up to 8 sets of batteries 18 without intervention by the host computer 12.

As previously stated, the host computer 12 stores the predetermined formation charging schedule for each battery type to be formed. Upon selection of a particular battery type, the host computer then transmits the required charging program to each of the slave computers 14 by means of the fiber optic data link 15. The fiber optic data link is used because of the high speed of data transferred in the noisy industrial environment. In addition, the switching of the SCR's in the SCR assemblies 24 causes an extremely noisy environment for computer data transmission. The preferred charging program for each battery type comprises, but is not limited to, five steps, one or more of which may not be used. Each step preferably takes one of three forms: (a) A charging cycle consisting of a charging current for a number of ampere-hours; (b) a rest cycle consisting of zero (0) charging current and a rest time in minutes; and (c) an end of program step consisting of zero (0) charged current and zero (0) time limit.

When switch 34 is in the "Automatic" position, the slave computer 14 energizes the control module 16 by generating an "ON" signal. The "ON" signal is applied to the control terminal of the first state relay 38 which causes 24 VAC to be applied to the contact or coil 32. This closes the contactor contacts 22 which causes the three-phase 240 VAC input power to be applied to the SCR assembly 24.

The SCR firing circuit 26 controls the amount of current applied to the batteries 18 by phasing the SCR's full on or phasing them back. If the SCR's are phased full on, they act like rectifiers which would then yield an output of approximately 324 volts ($1.35 \times 240$ volts=324 volts). As the SCR's are phased back, the output voltage correspondingly drops. This phase back can continue until the SCR's are turned off completely at which the output voltage goes to zero (0). The amount by which the SCR's are phased is controlled by a 0–5 volt analog signal coupled to the "SIG HI" input at pin 10 of connector J3 of the SCR firing circuit 26. The operation is explained in detail in the aforementioned Enerpro Product Data Sheets; however, to summarize, a zero (0) volt input at "SIG HI" turns the SCR's off causing the current output to the batteries being formed to be zero (0). A 5 volt input on the "SIG HI" input pin causes the SCR's to be phased full on thereby generating an output of approximately 324 volts DC. Consequently, the voltage output, and accordingly the formation current to the batteries 18, can be controlled by varying the analog signal applied to the "SIG HI" input of the SCR firing circuit 26. This analog signal is generated either by a digital to analog converter in the slave computer 14 in the automatic mode, or by operational amplifier 48 in the manual mode.

In the automatic mode, the slave computer 14 receives a "shunt signal" from the output of the isolation amplifier 42 which is representative of the amount of formation current being applied to the batteries through the shunt 28. Using this shunt signal, the slave computer is able to provide the appropriate voltage on the "SIG HI" line in order to establish the correct formation current. The slave computer repeatedly monitors the shunt signal to insure that the correct formation current is being applied to the batteries 18.

During the manual mode and the manual/off-/automatic switch 34 in the manual position, the "SIG HI" signal is furnished by operational amplifier 48 whose output is proportional to the difference between the voltages appearing at its input terminals. Since one of these voltages is related to the voltage appearing at the voltage terminals of the current shunt 28, the output of operational amplifier 48 can be adjusted by adjusting the potentiometer 52 which will cause the output from operational amplifier 48 to vary as a function of a difference between the voltage at the wiper of potentiometer 52 and the voltage representative of the current shunt voltage. This permits the current output to the batteries to be manually adjusted.

For emergency shutdowns, for example those necessitated by a dead short across the output from the SCR assembly 24, the slave computer will generate a signal at the "$I_1$" terminal of the SCR firing circuit 26, which will cause an immediate cut off of the SCR's in the SCR assembly 24. Under normal circumstances, the slave computer will generate a signal to the "$I_1$" terminal of the SCR firing circuit which will cause the SCR assembly to phase off at a gradual rate. The details of the operation of the SCR firing circuit 26 is a result of the application of either the $I_1$ or $I_2$ signals, can be found in the aforementioned Enerpro Product Data Sheets.

In addition to the charging program, the slave computer 14 also monitors the temperature of the batteries. It does this by monitoring the 8 temperature signals output by the temperature signal conditioning circuit 56. As previously stated, the temperature signal conditioning circuit 56 is connected to the temperature transmitter which is in turn connected to 8 temperature sensors, one of which is placed on one battery within each battery set. if a predetermined maximum temperature ($t_1$) is exceeded the charging stops. A second temperature ($t_2$) is used to control the operation of a valve for cooling water and the charging current is reduced. Upon detection of the second temperature ($t_2$), the slave computer 14 outputs a "WATER" control signal to the control terminal of the second solid-state relay 40 which causes an 24 V AC voltage to be applied to a water control solenoid (not shown). Application of this AC voltage causes the water control solenoid to operate a valve admitting cooling water around the batteries.

The sequence of operation of the system is as follows. First, the operator applies power to the host computer 12. A battery backed real time clock loads time and date into the RAM area of the host computer 12. The operator program for the host computer 12 is loaded from a disk memory automatically. The battery part numbers and their charging schedules are loaded into the host RAM area from the disk automatically. A display is then placed on the screen of the host computer monitor, which display shows the following for any given circuit:

(a) Date and time
(b) Charger number
(c) Status of charge
(d) Conditions that turn charger off
(e) Ampere hours or minutes this step
(f) Total ampere hours this cycle
(g) Battery part number
(h) Quantity of batteries in circuit
(i) Steps for charging cycle
(j) KWH demand priority
(k) Time on charge The host computer 12 sends a command message, for example <A01D>, which is a request to slave computer A to send data on circuit A1. The data on circuit A1 is returned from the slave computer as, for example, <A01 (followed by data in serial format)>. This data comprises answers which fill in the display presented for the operator on the host computer cathode ray tube (CRT) screen. The host computer software decodes the information in the serial string of data and places it on the CRT screen in the proper places in the display format.

The operator then enters a circuit number into the host computer 12; for example, B5. The host computer 12 then transmits a command message, for example <B05D>, which is a request to slave computer B to send data on circuit B5. The data on circuit B5 is returned from the slave computer to the host computer as a data message, for example <B05 (followed by data in serial format)>. The host computer 12 decodes the information in the string of data and places it on the screen in the proper places in the CRT display format.

The operator than enters a battery part number into the host computer 12. The host computer 12 searches its files for the part number. If found, it then searches its files for the charging schedule. If the part number is not found, it displays this result on the CRT screen and allows the operator to input a schedule for this unfound part number. The host computer 12 then sends the schedule to the slave computer 14 as a command message, for example <B05 (followed by a command in serial format)>. This command is then echoed back to the host from the slave to verify that the correct schedule was sent without errors.

The operator then presses a function key to start the charging. A command message, for example <B05S>, is sent to tell the slave computer 14 to start charging. At this time, the slave computer 14 performs all of the control functions without intervention from the host computer 12. The slave computers 14 are polled for errors or conditions that turn the charger off. This is accomplished by sending a command message, for example <B01E>. This message asks slave computer B to send information for any errors on any of its chargers to the host to be recorded and sent to the printer with time and date. The host computer sends a command message, for example <B05D>, on a two second basis to update the host computer display format on current, time and ampere hours. If the format is set up to show more than one charging circuit, the number after the "B" in this case would be incremented and then transmitted. All circuits are scanned one at a time to update the display.

To stop the circuit remotely from the host computer, the operator presses a function key. The host then sends a command message, for example <B05H>, to halt the charging process. To resume, the operator then presses a function key which sends a command message, for example <B05R>, from the host computer 12 to the slave computer 14 to resume charging.

The scheduling computer 11, is preferably located in a production office area. With this computer, a production scheduling person could access the second fiber optic data link port on each slave computer 14. This access is for data acquisition only, since no control is available from this port. The production scheduling person is then able to determine what battery types are on charge as well as the end of charge time. This allows the scheduling person to keep a close inventory and schedule the production department by knowing when the batteries are off charge. He would also know the space available (that is, chargers not in use) in the formation department at any given time, to schedule production into the department.

The host computer 12 automatically loads data into the appropriate slave computers 14 which control the modules 16 connected to the batteries to be charged. The data held in the non-volatile memory of each slave computer 14 is:

(a) Charger address location letter (A–Z) and number (1–32).
(b) The five step charging program.
(c) Maximum temperature per step in degrees F.
(d) Set back temperature per step in degrees F.
(e) Battery part No. (preferably nine characters).
(f) Number of batteries in the circuit (preferably two digits).
(g) Current amp-hours or time.
(h) Priority of charge. Upon start-up following a power failure, the charging process will resume where halted. Each slave computer 14 will automatically stagger start-up without intervention from the host computer 12 in order to reduce the load on electrical switch gear and transformers. On power recovery from a power loss, the slave computer 14 will start charger No. 1. The current is ramped from zero to the predetermined magnitude which had been applied before the power failure. At 75% of the charge rate, the No. 2 charger is ramped on. Each succeeding charger is ramped on likewise until all chargers are on. The ramping and step delay is implemented to reduce the load on switch gear and the power company equipment. If a charger was not operating before the power loss, the slave computer 14 will bypass that charger and go to the next. This start up procedure is controlled within the software of each slave computer 14. By means of operation of the manual/automatic mode switch 34 to the manual position, the system is operable manually as well as automatically as previously described.

The temperature of each battery being charged is monitored and can be displayed on the CRT screen of the host computer 12. Temperature maximums are indicated for each step. Should temperature of a battery rise to an unsafe level, the current is reduced by a predetermined amount (preferably 5 amps). The temperature is monitored and compared to the desired operating range. If the temperature continues to rise, the current is reduced by another predetermined amount (preferably 5 amps) until it reaches a predetermined minimum (preferably 10 amps). The water valve is automatically operated as previously described in order to speed cooling of the overheated batteries. If temperature cannot be reduced and the predetermined maximum temperature level is attained, the apparatus will remove the charging current from the overheated batteries and provide the operator with an over temperature alarm message. At the same time, the system will continue charging those batteries which are not overheating. As the overheated batteries cool, the current will increase in predetermined increments (preferably 5 amps each) to the scheduled stepped current in order to permit the fastest possible charging.

Each slave computer 14 periodically compares charging parameters with predetermined failure limits and automatically removes charging power in the event that the parameter exceeds the failure limit. In addition to automatically removing charging power, the slave computer 14 will send a failure message to the host computer 12 which in turn will automatically display the failure to the operator. Incidents which cause cessation of charging power and generation of failure messages in the preferred embodiment are: cycle complete;

program missing; open circuit; bad connection; short circuit; charger failure; over temperature; and program bug.

The cycle complete message is generated at the end of the predetermined number of charging steps; that is, the ampere hours required to charge the batteries have been supplied. The program missing message is generated upon determination that the program stored in the RAM area of a slave computer 14 has been lost; or a resume or start button has been depressed by an operator without entering the part number. The open circuit message is generated when the current, as sensed through shunt 28, is zero and the "SIG HI" signal generated by the slave computer 14 is at its maximum value. The bad connection message is generated when the current, as sensed through shunt 28, is other than zero but less than the desired current; and the "SIG HI" signal generated by the slave computer 14 is at its maximum value. This is indicative of a high impedance or bad connection.

The short circuit message is generated when the current, as sensed through shunt 28, is greater than the desired current and the "SIG HI" signal generated by the slave computer 14 has no control in varying the current magnitude. The charger failure message is generated when the current, as sensed through shunt 28, does not increase in accordance with the magnitude of the "SIG HI" signal generated by the slave computer 14. The over temperature message is generated as set forth previously. The program bug message is generated upon detection that the program, although not missing, is not in usable form. This is a diagnostic error that occurs when the slave computer 14 cannot decipher the program.

It will be understood that various changes in the details, materials and arrangement of parts which have been herein described and illustrated in order to explain the nature of this invention, may be made by those skilled in the art within the principle and scope of the invention as expressed in the following claims.

I claim:

1. An apparatus for charging electric storage batteries, said apparatus comprising:
   (a) a host computer for providing charging information to and receiving status information from at least one slave computer by means of a data link; and
   (b) at least one control module coupled to said slave computer for applying charging current to at least one electric storage battery in response to instructions received from said slave computer, and for providing feedback and status information to said slave computer.

2. An apparatus in accordance with claim 1 wherein said data link comprises a fiber optic data link.

3. An apparatus in accordance with claim 1 wherein said control module comprises:
   (a) means for supplying direct electrical current of a predetermined, adjustable magnitude; and
   (b) means for monitoring the magnitude of said direct current.

4. An apparatus in accordance with claim 3 wherein said control module additionally comprises:
   (a) means for monitoring the temperature of said battery; and
   (b) means for controlling the temperature of said battery.

5. An apparatus in accordance with claim 4 additionally comprising:
   (a) means for comparing Kwh demand being used against a predetermined minimum level; and
   (b) means for increasing charging power applied to batteries in accordance with a predetermined schedule when the Kwh demand is reduced to said predetermined minimum level.

6. An apparatus in accordance with claim 4 additionally comprising means for comparing predetermined charging parameters with predetermined failure limits and automatically removing charging power in the event that a predetermined parameter exceeds its respective failure limit.

7. An apparatus in accordance with claim 6 additionally comprising means for providing an alarm in the event that a predetermined parameter exceeds its respective failure limit.

8. An apparatus in accordance with claim 4 additionally comprising a scheduling computer for receiving, formatting and displaying status schedule and inventory information from said slave computer by means of a data link.

9. An apparatus in accordance with claim 1 additionally comprising means for energy management control comprising:
   (a) means for receiving a signal representative of Kwh demand being consumed;
   (b) means for comparing Kwh demand being used against a predetermine maximum level; and
   (c) means for reducing charging power applied to batteries in accordance with a predetermined priority schedule when the Kwh demand exceeds said predetermined maximum level.

10. An apparatus in accordance with claim 5 wherein said data link comprises a fiber optic data link.

11. An apparatus in accordance with claim 1, comprising at least two control modules, wherein said control modules are sequentially activated in order to stagger re-application of charging current to the batteries in accordance with a predetermined schedule following a power failure.

* * * * *

UNITED STATES PATENT AND TRADEMARK OFFICE
CERTIFICATE OF CORRECTION

PATENT NO. : 4,684,872

DATED : August 4, 1987

INVENTOR(S) : Jimmy L. Stewart

It is certified that error appears in the above-identified patent and that said Letters Patent is hereby corrected as shown below:

Column 4, line 31, "a" should be --A--.

Column 8, line 15, "$I_1$" should be "$I_2$".

Column 8, line 29, "if" should be --If--.

Column 10, lines 13 through 35, "Upon start-up ... as previously described." should be located across the full width of column 10 starting at line 14.

Signed and Sealed this

Twelfth Day of January, 1988

Attest:

DONALD J. QUIGG

*Attesting Officer*    *Commissioner of Patents and Trademarks*